United States Patent
Chuang

(10) Patent No.: US 11,065,755 B2
(45) Date of Patent: Jul. 20, 2021

(54) FOOT-OPERATED BICYCLE WORK STAND

(71) Applicant: Louis Chuang, Taichung (TW)

(72) Inventor: Louis Chuang, Taichung (TW)

(*) Notice: Subject to any disclaimer, the term of this patent is extended or adjusted under 35 U.S.C. 154(b) by 0 days.

(21) Appl. No.: 16/935,348

(22) Filed: Jul. 22, 2020

(65) Prior Publication Data

US 2021/0101275 A1    Apr. 8, 2021

(30) Foreign Application Priority Data

Oct. 8, 2019 (TW) ................................. 108136363

(51) Int. Cl.
*B25H 1/00* (2006.01)
*F16M 11/24* (2006.01)
*F16M 11/18* (2006.01)

(52) U.S. Cl.
CPC ........... *B25H 1/0014* (2013.01); *F16M 11/18* (2013.01); *F16M 11/245* (2013.01)

(58) Field of Classification Search
CPC .. B25H 1/0014; B25H 1/0035; B25H 1/0007; B62H 1/06; B62H 3/00; B62H 2700/00; F16M 11/18; F16M 11/245; B25B 11/00; B66F 5/00; B66F 7/00; B66F 11/00
USPC ................... 211/22, 1.3, 203; 108/115, 128; 248/154, 158, 161, 157, 163.1, 431, 165, 248/166, 168, 169, 170, 171; 269/71; 254/133 R, 134
See application file for complete search history.

(56) References Cited

U.S. PATENT DOCUMENTS

| 2,861,408 | A | * | 11/1958 | Schultz | B65B 25/20 53/256 |
| 3,464,305 | A | * | 9/1969 | Meazzi | G10D 13/065 84/422.3 |
| 4,381,690 | A | * | 5/1983 | Kimble | G10D 13/065 248/171 |
| 4,865,382 | A | * | 9/1989 | Marshall | A47C 9/025 297/195.11 |

(Continued)

FOREIGN PATENT DOCUMENTS

| CN | 200977957 Y | 11/2007 |
| CN | 206234584 U | 6/2017 |

(Continued)

OTHER PUBLICATIONS

Korean Application No. 10-2015-0095621; "The Bicycle Equipping Company Using the Air Pressure"; Applicant: Hui-Sang Gang; Jul. 4, 2015. (Year: 2015).*

*Primary Examiner* — Jennifer E. Novosad
(74) *Attorney, Agent, or Firm* — Karin L. Williams; Alan D. Kamrath; Mayer & Williams PC

(57) ABSTRACT

A foot-operated bicycle work stand includes a frame and a lifting device. The frame includes a fixed post, a lifting rod, and at least one leg. The lifting rod is slidably mounted in the fixed post. The at least one leg is connected to the fixed post and is adjacent to a bottom end of the fixed post when in a folded state. The lifting device includes a pneumatic rod, a pedal, and a control cable. The pneumatic rod includes a first end received in the fixed post and a second end connected to the lifting rod. The pneumatic rod is telescopic and is configured to control the lifting rod to move relative to the fixed post. The control cable includes a first end connected to the pneumatic rod and a second end connected to the pedal.

4 Claims, 9 Drawing Sheets

(56) References Cited

U.S. PATENT DOCUMENTS

| | | | | |
|---|---|---|---|---|
| 5,078,351 | A * | 1/1992 | Gualtieri | A47C 3/30 188/300 |
| 5,105,706 | A * | 4/1992 | Lombardi | G10D 13/065 84/422.3 |
| 5,159,989 | A * | 11/1992 | Claxton | B60S 9/12 180/41 |
| 5,234,187 | A * | 8/1993 | Teppo | A47B 9/06 248/161 |
| 5,366,275 | A * | 11/1994 | Sulzer | A47C 3/30 248/161 |
| 5,465,946 | A * | 11/1995 | Smith | B23Q 1/28 269/75 |
| 5,944,896 | A * | 8/1999 | Landesman | B05B 13/0285 118/500 |
| 6,003,822 | A * | 12/1999 | Kurosaki | G10D 13/065 248/161 |
| 6,007,032 | A * | 12/1999 | Kuo | F16M 11/10 248/125.1 |
| 6,116,249 | A * | 9/2000 | Tuffery | A45D 29/05 132/200 |
| 6,550,728 | B1 * | 4/2003 | Fuhrman | A47B 9/02 108/146 |
| 6,644,748 | B2 * | 11/2003 | Tholkes | A47B 9/00 297/423.12 |
| 6,930,232 | B2 * | 8/2005 | Shigenaga | G10D 13/065 84/422.3 |
| 7,182,358 | B2 | 2/2007 | Felsl et al. | |
| 7,584,973 | B2 * | 9/2009 | Brager | B25H 3/026 108/141 |
| 7,696,422 | B1 * | 4/2010 | Chang | G10D 13/065 84/422.1 |
| 7,696,423 | B1 * | 4/2010 | Schiano | G10D 13/065 84/422.3 |
| 8,020,817 | B2 * | 9/2011 | Yu | G10G 5/00 248/125.8 |
| 8,684,654 | B2 * | 4/2014 | Bardin | B66F 9/18 414/427 |
| 9,076,415 | B2 * | 7/2015 | Allen | G10D 13/28 |
| 10,816,131 | B2 * | 10/2020 | Lee | F16M 13/022 |
| 2004/0004165 | A1 * | 1/2004 | Hong | F16M 11/2014 248/132 |
| 2004/0046091 | A1 * | 3/2004 | Chuang | B25B 1/2484 248/125.1 |
| 2005/0056740 | A1 * | 3/2005 | Chuang | B25H 1/0014 248/176.1 |
| 2005/0109895 | A1 * | 5/2005 | Hsieh | G10D 13/065 248/170 |
| 2005/0189454 | A1 * | 9/2005 | Smith | F16M 11/18 248/127 |
| 2006/0086233 | A1 * | 4/2006 | Spivack | G10D 13/065 84/422.1 |
| 2006/0231696 | A1 * | 10/2006 | Barrios | B25H 1/0014 248/124.1 |
| 2007/0252919 | A1 * | 11/2007 | McGreevy | F16M 11/10 348/825 |
| 2010/0207351 | A1 * | 8/2010 | Klieber | B62K 19/36 280/278 |
| 2011/0056898 | A1 * | 3/2011 | Foley | A47B 23/046 211/85.8 |
| 2012/0007298 | A1 * | 1/2012 | Proietti | B25H 1/16 269/59 |
| 2012/0097010 | A1 * | 4/2012 | Michael | G10D 13/065 84/422.3 |
| 2013/0219705 | A1 * | 8/2013 | Scholtz | B25H 1/0014 29/650 |
| 2014/0041180 | A1 * | 2/2014 | Williams | F16M 11/20 29/402.01 |
| 2015/0157522 | A1 * | 6/2015 | Blankenship | A61G 12/008 224/547 |
| 2015/0159804 | A1 * | 6/2015 | Bowman | F16M 11/045 248/122.1 |
| 2016/0297063 | A1 * | 10/2016 | Chuang | B25H 1/0014 |
| 2020/0294476 | A1 * | 9/2020 | Gold | G10D 13/02 |

FOREIGN PATENT DOCUMENTS

| | | |
|---|---|---|
| TW | I248888 B | 2/2006 |
| TW | M525826 U | 7/2016 |

\* cited by examiner

US 11,065,755 B2

FOOT-OPERATED BICYCLE WORK STAND

BACKGROUND OF THE INVENTION

The present invention relates to a bicycle work stand and, more particularly, to a foot-operated bicycle work stand for lifting and lowering a bicycle.

Taiwan Utility Model No. M525826 discloses a bicycle repair stand including a folding/unfolding unit and a post disposed in the folding/unfolding unit. A positioning sleeve is disposed on a top end of the post. A lifting column is disposed in the post. A coupler is disposed on a top end of the lifting column. A clamp is disposed on a front end of the coupler and is adjustable in an angular position thereof. The folding/unfolding unit includes a runner disposed on an outer periphery of the post and first and second legs pivotably mounted to the runner. A holding sleeve is disposed to a bottom end of the post. A first link is pivotably connected between the holding sleeve and the first leg. A second link is pivotably connected between the holding sleeve and the second leg. When the bicycle repair stand is unfolded for use, the runner moves towards the holding sleeve and away from the positioning sleeve. The first and second links push the first and second legs to an unfolded position and then lie beside sides of the first and second legs, respectively.

However, after a repairman fixes a bicycle to the clamp during use of the bicycle repair stand, the repairman has to manually lift the lifting column to a desired height and fix the bicycle in place before the repair operation, which is inconvenient to use and is laborious.

Thus, a need exists for a novel bicycle work stand that mitigates and/or obviates the above disadvantages.

BRIEF SUMMARY OF THE INVENTION

An objective of the present invention is to provide a foot-operated bicycle work stand including a frame and a lifting device. The frame includes a fixed post, a lifting rod, and at least one leg. The fixed post includes a top end and a bottom end opposite to the top end. The lifting rod is slidably mounted in the fixed post and is adjacent to the top end of the fixed post. The at least one leg is connected to the fixed post and is adjacent to the bottom end of the fixed post when in a folded state. The lifting device includes a pneumatic rod, a pedal, and a control cable. The pneumatic rod includes a first end received in the fixed post and a second end connected to the lifting rod. The pneumatic rod is telescopic and is configured to control the lifting rod to move relative to the fixed post. The control cable includes a first end connected to the pneumatic rod and a second end is connected to the pedal.

In an example, each of the fixed post and the lifting rod is hollow. An end of the lifting rod is slidably inserted into the fixed post via the top end. A head seat is coupled to an end of the lifting rod opposite to the fixed post. The first end of the pneumatic rod is received in the fixed post. The second end of the pneumatic rod is received in the lifting rod and is connected to the head seat.

In an example, a control head is coupled to the first end of the control cable, is disposed on the bottom end of the fixed post, and is connected to the first end of the pneumatic rod. A pivotal member and an abutting member are pivotably mounted to the control head. The pivotal member includes a traction portion and a push portion. A pivotal portion is disposed between the traction portion and the push portion and is pivotably connected to the control head. The control cable is connected to the traction portion and is configured to pull the pivotal member to pivot. The push portion abuts against the abutting member. A side of the abutting member opposite to the push portion abuts against the pneumatic rod.

In an example, the foot-operated bicycle work stand further includes three links. The at least one leg includes three legs. A runner is mounted around the fixed post and is slidable in an axial direction of the fixed post between a folded position and an unfolded position. Each of the three legs includes first and second ends. The first end of each of the three legs is pivotably connected to the runner. Each of the three links includes a first end pivotably connected to an intermediate portion between the first and second ends of one of the three legs and a second end pivotably connected to the fixed post. When the runner moves from the unfolded position to the folded position, each of the three legs moves in a radial direction of the fixed post towards the fixed post. When the runner moves from the folded position to the unfolded position, each of the three legs moves in the radial direction of the fixed post away from the fixed post. The pedal is disposed on one of the three legs.

The present invention will become clearer in light of the following detailed description of illustrative embodiments of this invention described in connection with the drawings.

DETAILED DESCRIPTION OF THE INVENTION

Figure 1:
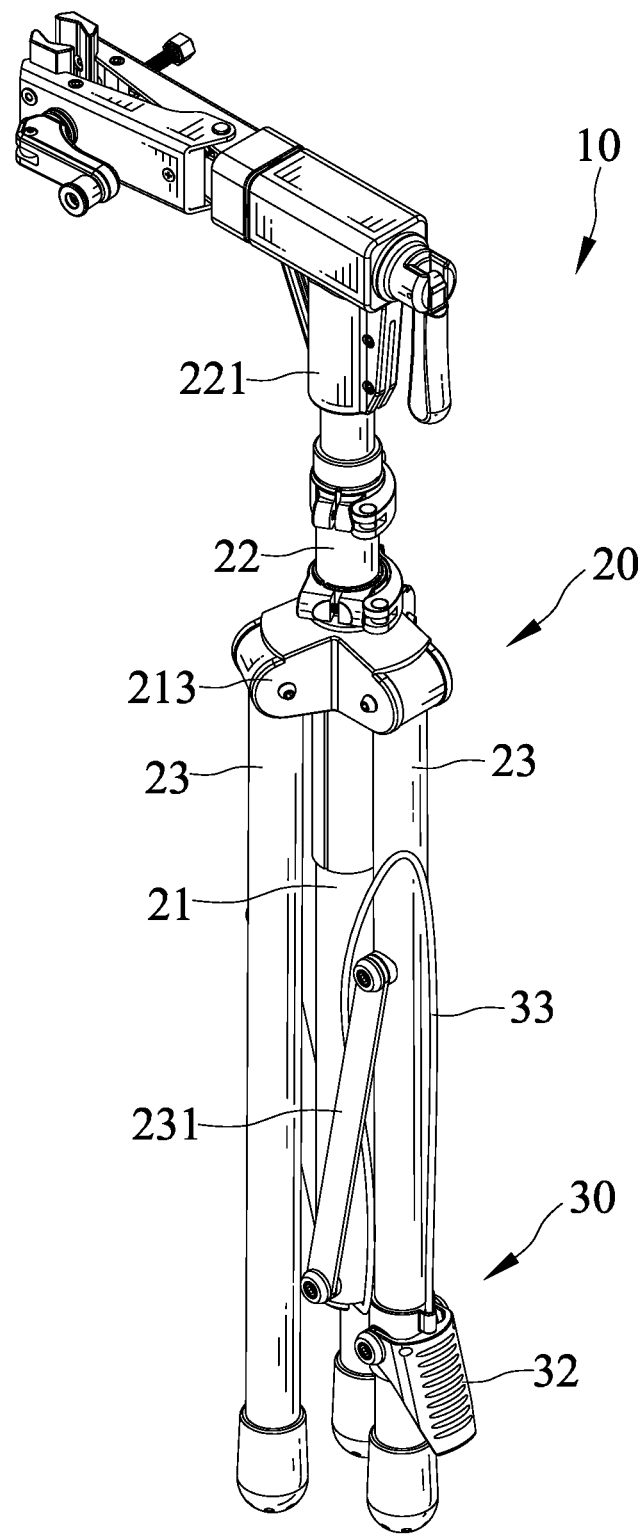
FIG. 1 is a perspective view of a foot-operated bicycle work stand of an embodiment according to the present invention in a folded state.
Figure 2:
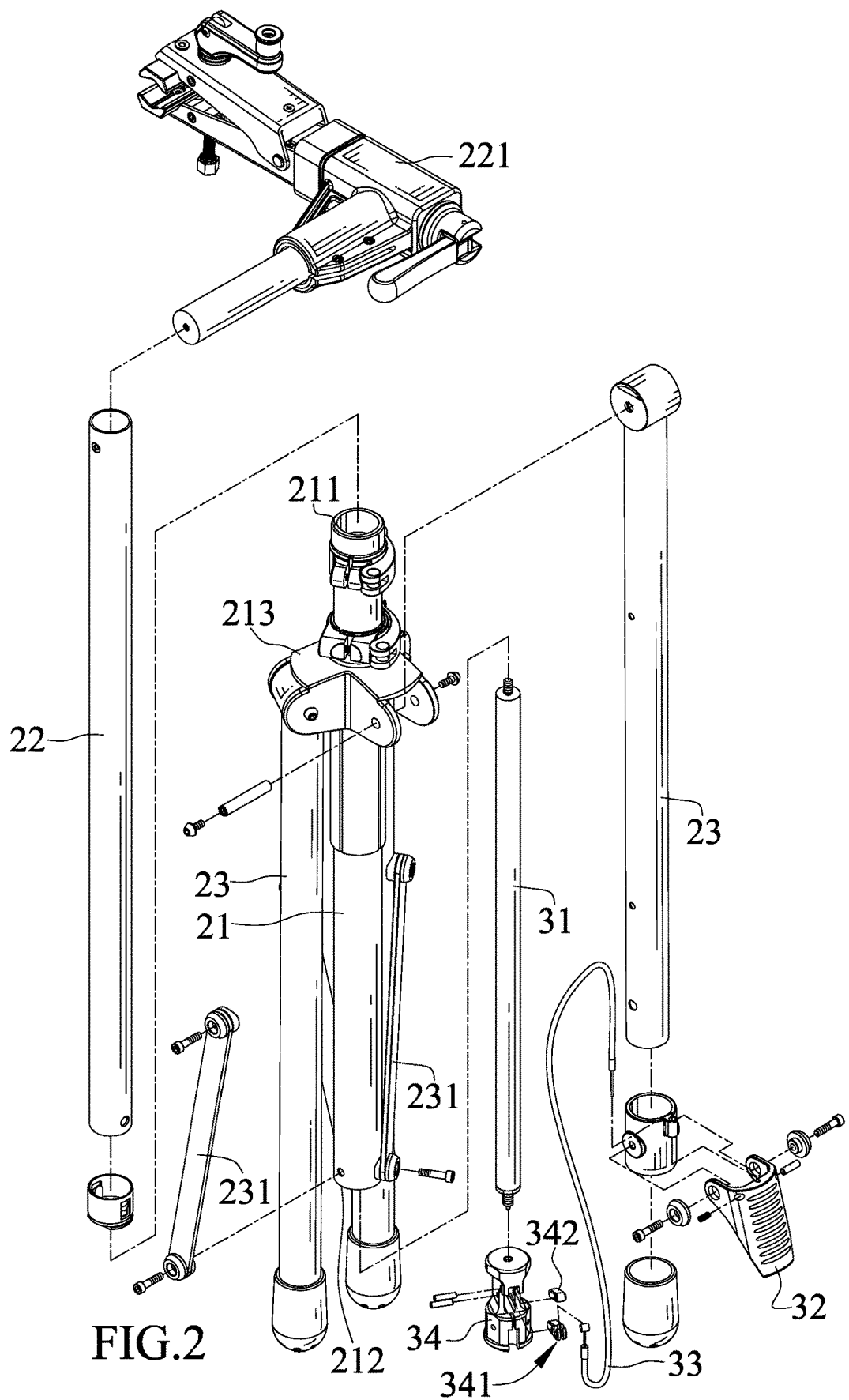
FIG. 2 is an exploded, perspective view of the foot-operated bicycle work stand of FIG. 1.
Figure 3:
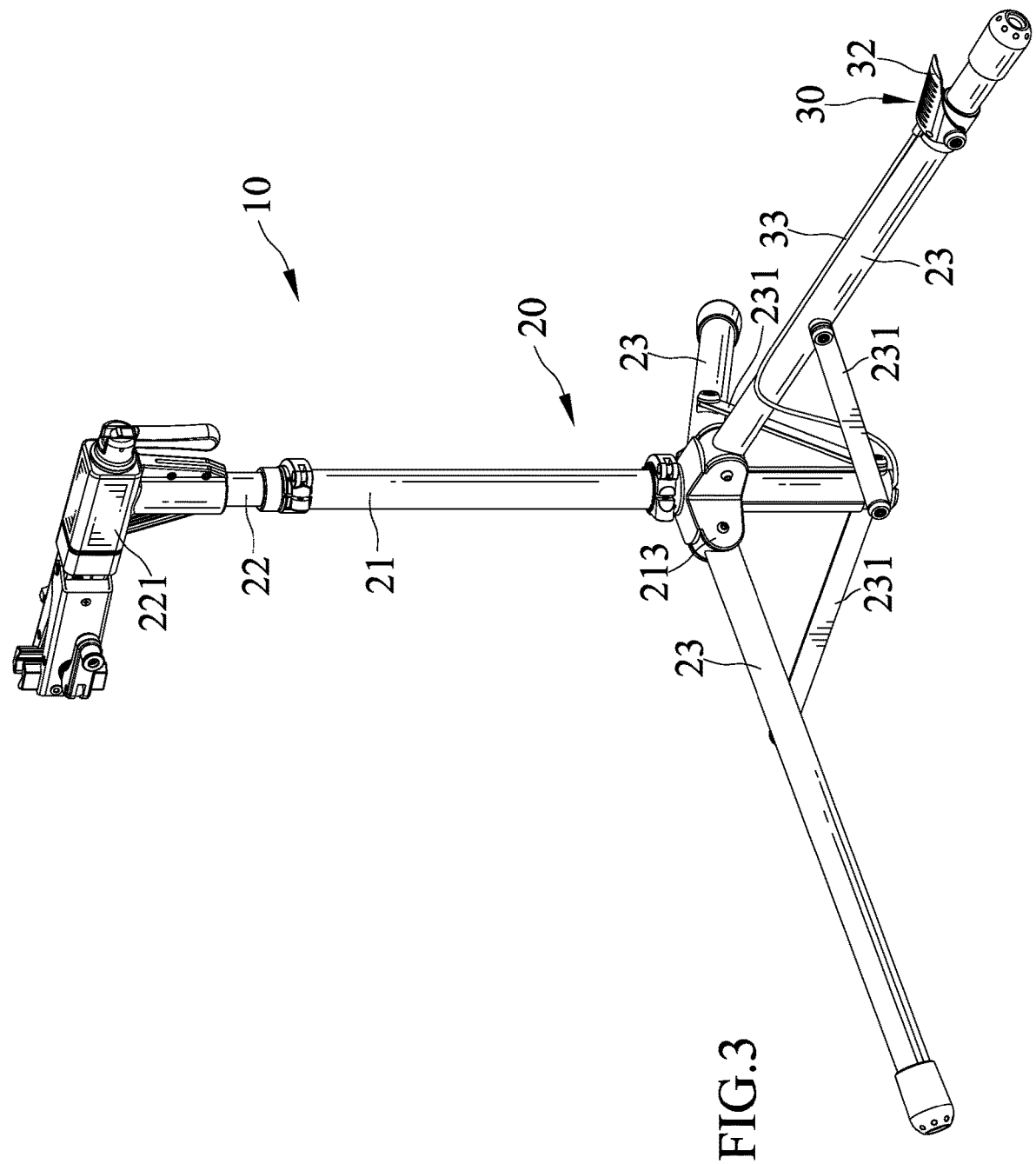
FIG. 3 is a perspective view of the foot-operated bicycle work stand of FIG. 1 in an unfolded state.
Figure 4:
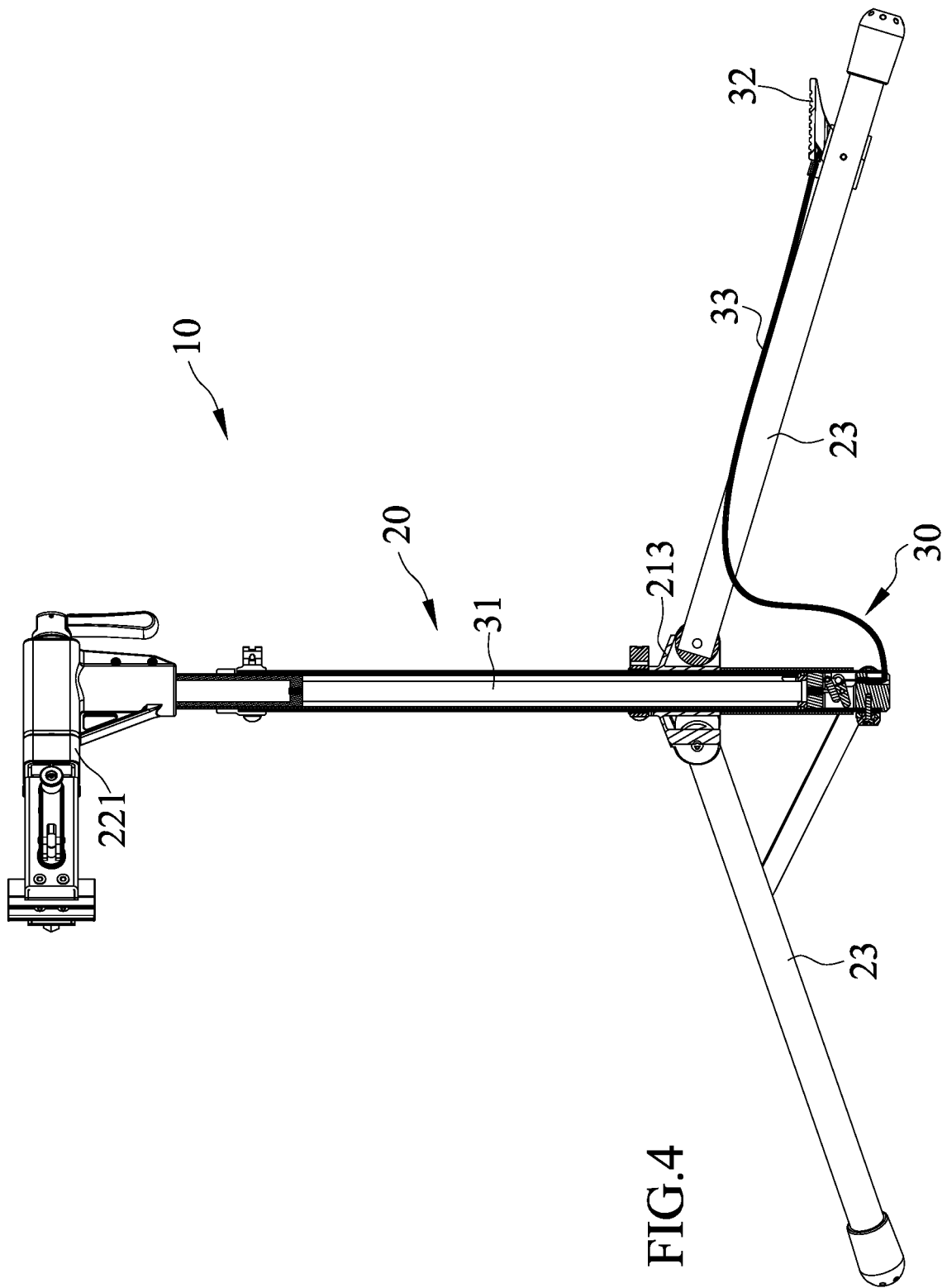
FIG. 4 is a cross sectional view of the foot-operated bicycle work stand of FIG. 3.
Figure 5:
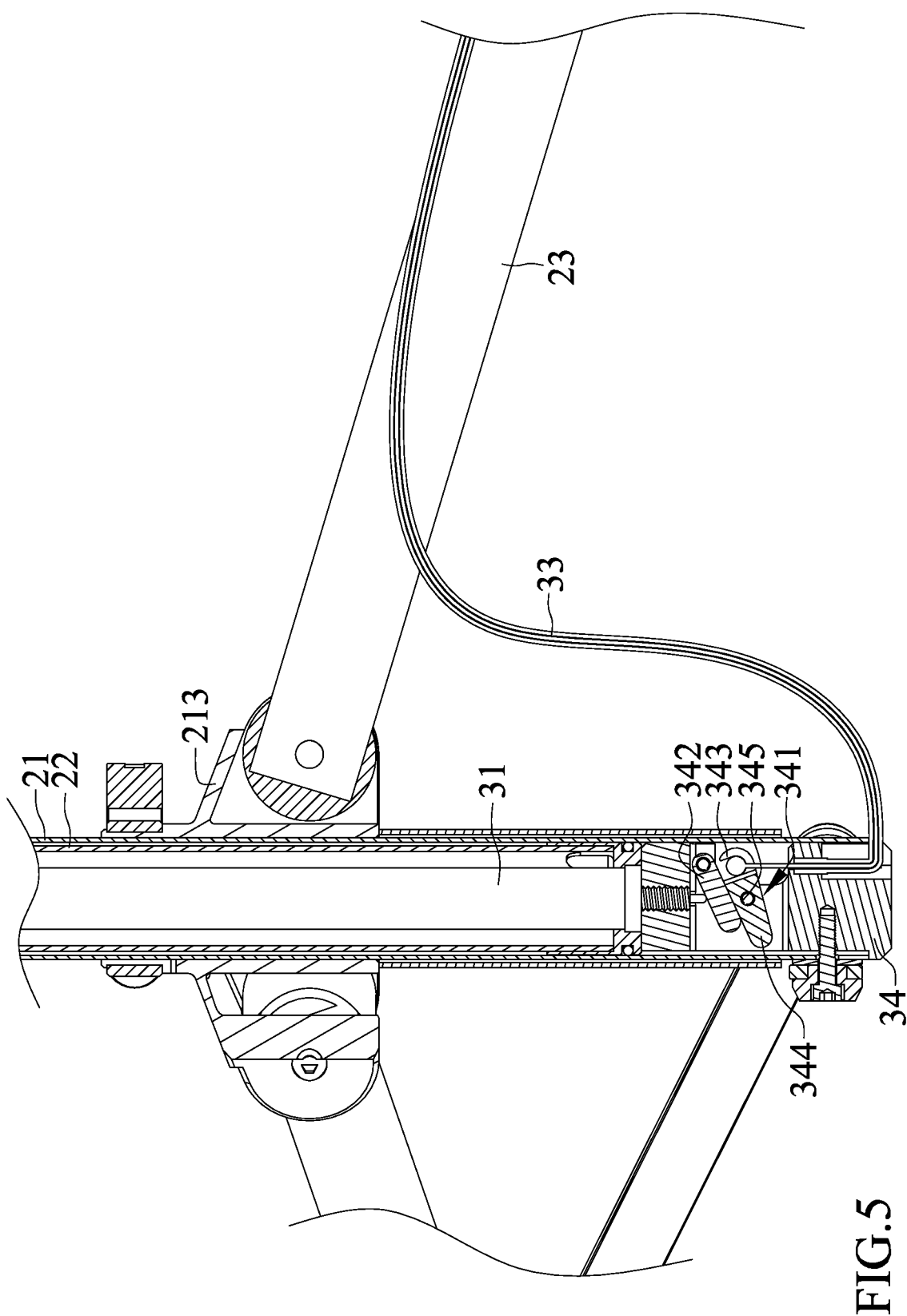
FIG. 5 is an enlarged view of a portion of FIG. 4, illustrating a control head of the foot-operated bicycle work stand.
Figure 6:
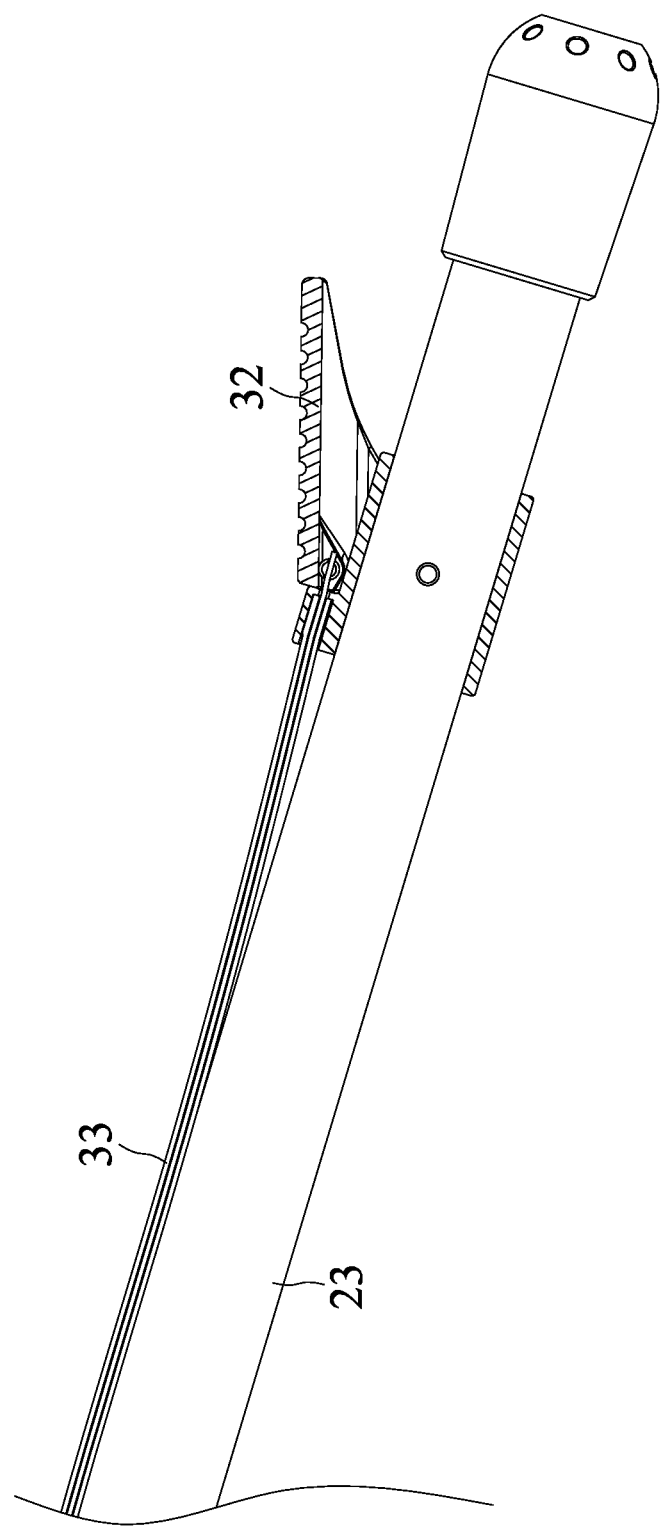
FIG. 6 is an enlarged view of another portion of the foot-operated bicycle work stand of FIG. 4.
Figure 7:
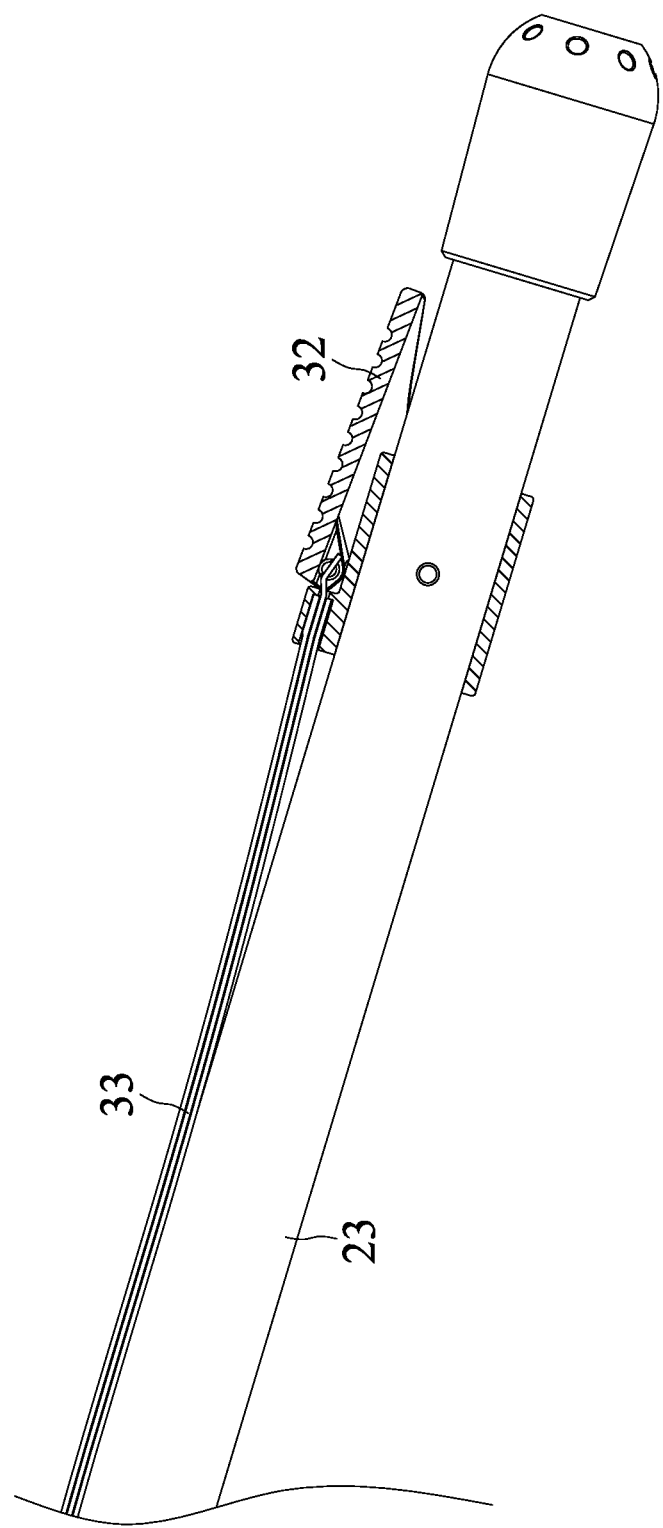
FIG. 7 is a view similar to FIG. 6 with a pedal pressed.
Figure 8:
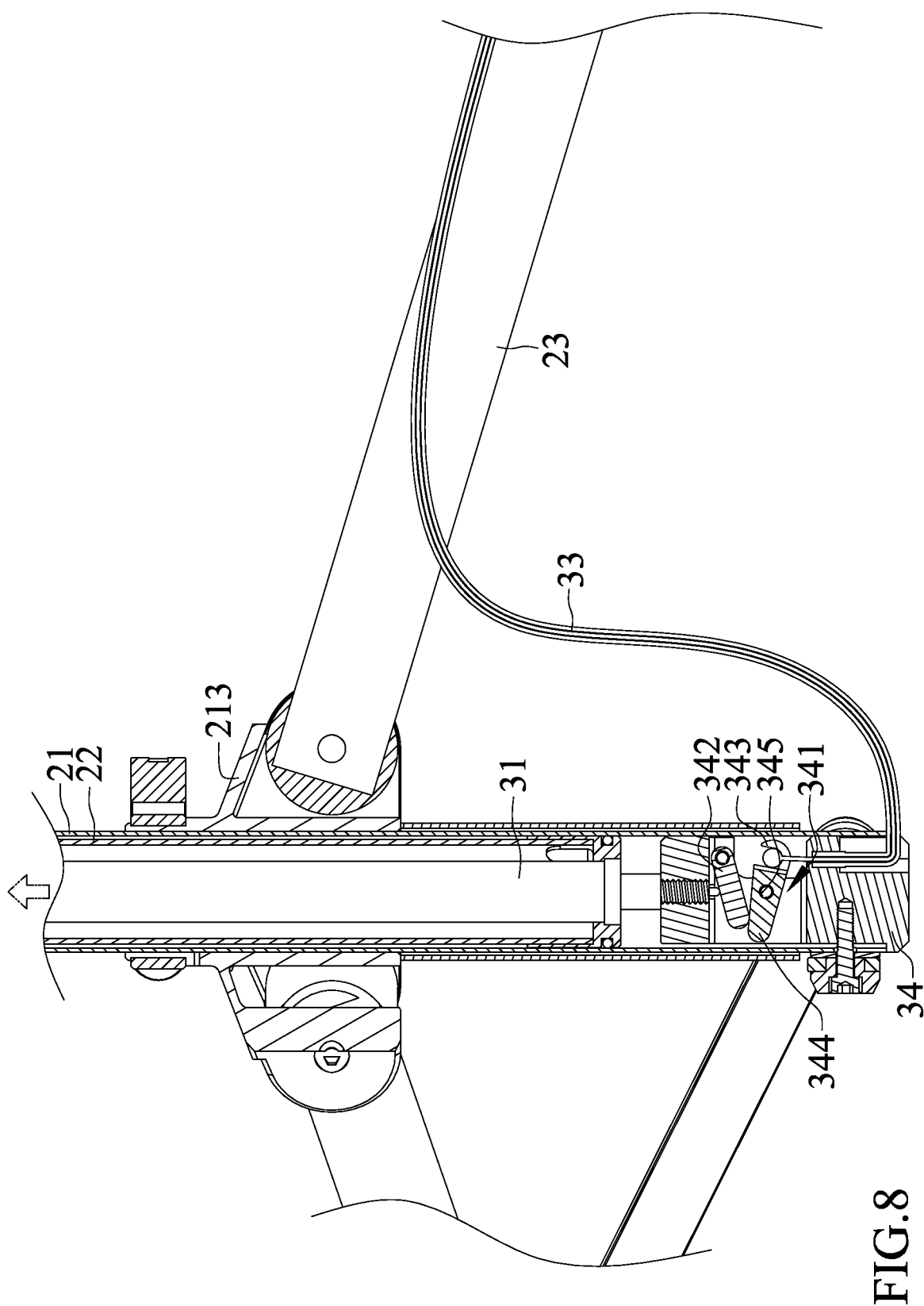
FIG. 8 is a view similar to FIG. 5, illustrating operation of the control head.
Figure 9:
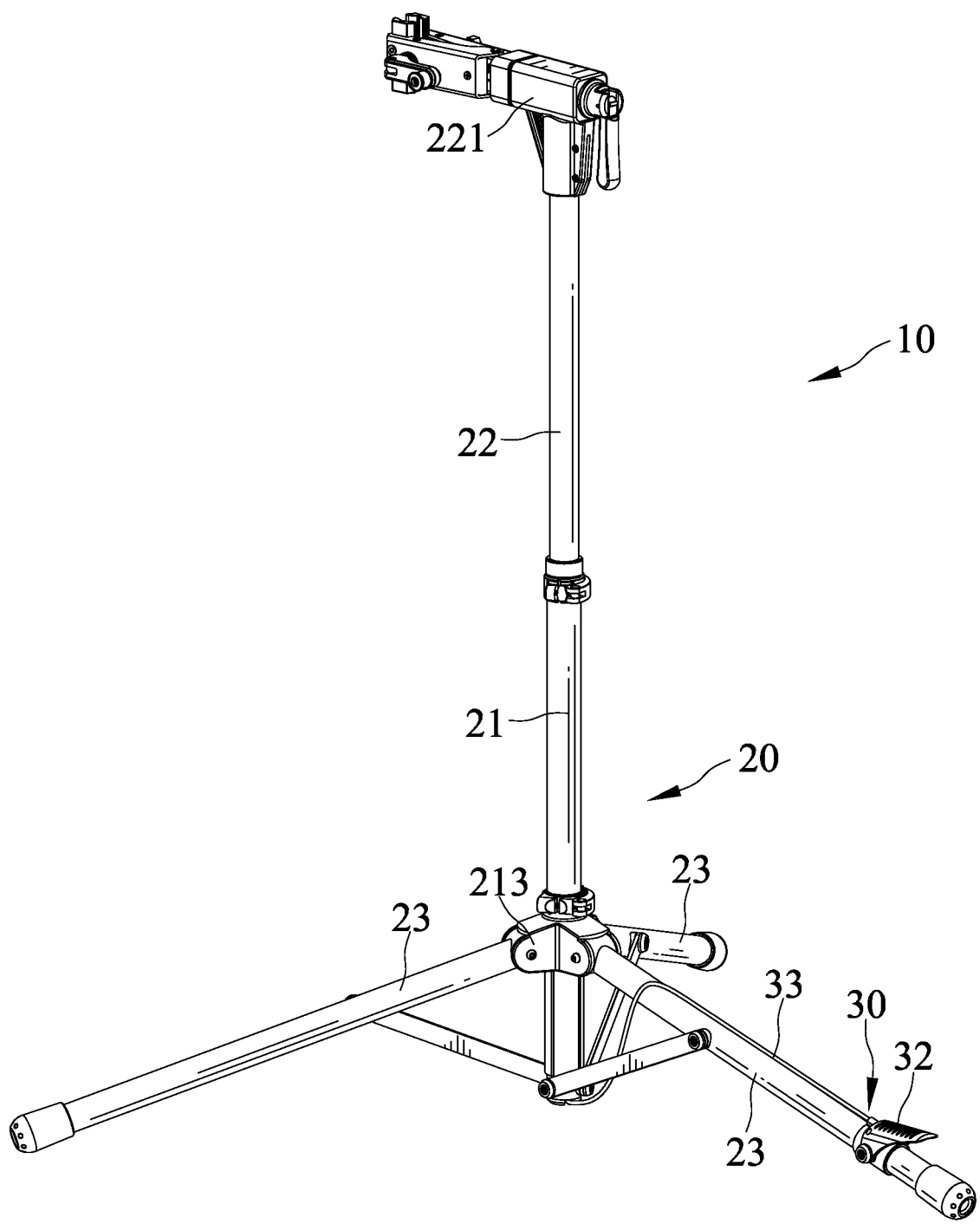
FIG. 9 is a perspective view illustrating the foot-operated bicycle work stand with a frame in a lifted state.

With reference to FIGS. 1-9, a foot-operated bicycle work stand 10 of an embodiment according to the present invention includes a frame 20 and a lifting device 30. With reference to FIGS. 1-6, the frame 20 includes a fixed post 21, a lifting rod 22, and at least one leg 23. The fixed post 21 includes a top end 211 and a bottom end 212 opposite to the top end 211. The lifting rod 22 is slidably mounted in the fixed post 21 and is adjacent to the top end 211 of the fixed post 21. The at least one leg 23 is connected to the fixed post 21 and is adjacent to the bottom end 212 of the fixed post 21 when in a folded state.

Each of the fixed post 21 and the lifting rod 22 is hollow. An end of the lifting rod 22 is slidably inserted into the fixed post 21 via the top end 211. A head seat 221 is coupled to an end of the lifting rod 22 opposite to the fixed post 21.

In this embodiment, the frame 20 includes three legs 23 and three links 231. A runner 213 is mounted around the fixed post 21 and is slidable in an axial direction of the fixed post 21 between a folded position and an unfolded position. Each of the three legs 23 includes first and second ends. The first end of each of the three legs 23 is pivotably connected to the runner 213. Each link 231 includes a first end pivotably connected to an intermediate portion between the first and second ends of one of the three legs 23 and a second end pivotably connected to the fixed post 21. When the runner 213 moves from the unfolded position to the folded position, each of the three legs 23 moves in a radial direction of the fixed post 21 towards the fixed post 21. On the other hand, when the runner 213 moves from the folded position to the unfolded position, each of the three legs 23 moves in the radial direction of the fixed post 21 away from the fixed post 21.

The lifting device 30 includes a pneumatic rod 31, a pedal 32, and a control cable 33. The pneumatic rod 31 includes a first end received in the fixed post 21 and a second end connected to the lifting rod 22. In this embodiment, the second end of the pneumatic rod 31 is received in the lifting rod 22 and is connected to the head seat 221. The pneumatic rod 31 is telescopic and is configured to control the lifting rod 22 to move relative to the fixed post 21. The pedal 32 is disposed on one of the three legs 23. Further, the pedal 32 may be disposed on the ground, too. The control cable 33 includes a first end connected to the pneumatic rod 31 and a second end is connected to the pedal 32.

With reference to FIGS. 2 and 4-6, a control head 34 is coupled to the first end of the control cable 33, is disposed on the bottom end 212 of the fixed post 21, and is connected to the first end of the pneumatic rod 31. A pivotal member 341 and an abutting member 342 are pivotably mounted to the control head 34. The pivotal member 341 includes a traction portion 343 and a push portion 344. A pivotal portion 345 is disposed between the traction portion 343 and the push portion 344 and is pivotably connected to the control head 34. The control cable 33 is connected to the traction portion 343 and is configured to pull the pivotal member 341 to pivot. The push portion 344 abuts against the abutting member 342. A side of the abutting member 342 opposite to the push portion 344 abuts against the second end of the pneumatic rod 31.

The foot-operated bicycle work stand according to the present invention can assist in adjustment of the height of the frame 20 through use of the lifting device 30. Thus, an operator can lift a bicycle without effort, which is convenient to repair or adjustment of the bicycle. Furthermore, since the pedal 32 is disposed on one of the three legs 23, the operator can press the pedal 32 with a foot and, thus, can use both hands to control the height of the frame 20 or to hold the bicycle to thereby avoid falling or wobbling of the bicycle.

Although specific embodiments have been illustrated and described, numerous modifications and variations are still possible without departing from the scope of the invention. The scope of the invention is limited by the accompanying claims.

The invention claimed is:

1. A foot-operated bicycle work stand comprising:
a frame including a fixed post, a lifting rod, and at least one leg, wherein the fixed post includes a top end and a bottom end opposite to the top end, wherein the lifting rod is slidably mounted in the fixed post and is adjacent to the top end of the fixed post, and wherein the at least one leg is connected to the fixed post and is adjacent to the bottom end of the fixed post when in a folded state; and
a lifting device including a pneumatic rod, a pedal, and a control cable, wherein the pneumatic rod includes a first end received in the fixed post and a second end connected to the lifting rod, wherein the pneumatic rod is configured to control the lifting rod to move relative to the fixed post, and wherein the control cable includes a first end connected to the pneumatic rod and a second end connected to the pedal.

2. The foot-operated bicycle work stand as claimed in claim 1, wherein each of the fixed post and the lifting rod is hollow, wherein an end of the lifting rod is slidably inserted into the fixed post via the top end, wherein a head seat is coupled to an end of the lifting rod opposite to the fixed post, wherein the first end of the pneumatic rod is received in the fixed post, and wherein the second end of the pneumatic rod is received in the lifting rod and is connected to the head seat.

3. The foot-operated bicycle work stand as claimed in claim 2, wherein a control head is coupled to the first end of the control cable, is disposed on the bottom end of the fixed post, and is connected to the first end of the pneumatic rod, wherein a pivotal member and an abutting member are pivotably mounted to the control head, wherein the pivotal member includes a traction portion and a push portion, wherein a pivotal portion is disposed between the traction portion and the push portion and is pivotably connected to the control head, wherein the control cable is connected to the traction portion and is configured to pull the pivotal member to pivot, wherein the push portion abuts against the abutting member, and wherein a side of the abutting member opposite to the push portion abuts against the pneumatic rod.

4. The foot-operated bicycle work stand as claimed in claim 3, further comprising three links, wherein the at least one leg includes three legs, wherein a runner is mounted around the fixed post and is slidable in an axial direction of the fixed post between a folded position and an unfolded position, wherein each of the three legs includes first and second ends, wherein the first end of each of the three legs is pivotably connected to the runner, wherein each of the three links includes a first end pivotably connected to an intermediate portion between the first and second ends of one of the three legs and a second end pivotably connected to the fixed post, wherein when the runner moves from the unfolded position to the folded position, each of the three legs moves in a radial direction of the fixed post towards the fixed post, wherein when the runner moves from the folded position to the unfolded position, each of the three legs moves in the radial direction of the fixed post away from the fixed post, and wherein the pedal is disposed on one of the three legs.

* * * * *